United States Patent [19]

Diem

[11] Patent Number: 4,543,488

[45] Date of Patent: Sep. 24, 1985

[54] TRANSPORTATION AND STORAGE FOR NUCLEAR FUEL WASTES

[75] Inventor: Hans Diem, Alzenau, Fed. Rep. of Germany

[73] Assignee: Transnuklear GmbH, Hanau, Fed. Rep. of Germany

[21] Appl. No.: 659,027

[22] Filed: Oct. 9, 1984

Related U.S. Application Data

[63] Continuation of Ser. No. 538,845, Oct. 5, 1983, abandoned, which is a continuation of Ser. No. 263,557, May 14, 1981, abandoned.

[30] Foreign Application Priority Data

Nov. 7, 1978 [DE] Fed. Rep. of Germany ... 7833030[U]

[51] Int. Cl.[4] .................................................. G21F 5/00
[52] U.S. Cl. .................. 250/507.1; 250/506.1
[58] Field of Search ............... 250/507.1, 506.1, 518.1, 250/515.1; 376/272

[56] References Cited

U.S. PATENT DOCUMENTS

| 3,119,933 | 1/1964 | Allan | 250/507.1 |
| 3,466,445 | 9/1969 | Schlies | 250/507.1 |
| 3,575,601 | 4/1971 | Linsay et al. | 376/272 |
| 3,824,673 | 7/1974 | Wurm et al. | 376/272 |
| 4,096,392 | 6/1978 | Rubinstein et al. | 376/272 |
| 4,257,912 | 3/1981 | Fleischer et al. | 376/272 |
| 4,292,528 | 9/1981 | Shaffer et al. | 250/515.1 |

FOREIGN PATENT DOCUMENTS

| 692521 | 8/1964 | Canada | 250/506.1 |
| 7707041 | 2/1978 | Netherlands | 376/272 |

*Primary Examiner*—Bruce C. Anderson
*Attorney, Agent, or Firm*—Cushman, Darby & Cushman

[57] ABSTRACT

An exchangeable basket for a container for the transportation and storage of nuclear fuel wastes comprises tubular members of steel and connecting elements for holding the tubular members in a desired position, the steel tubes and connecting elements being embedded in a cast material having a high heat conductivity and which is made from a non-ferrous metal or alloy; the tubes are shaped to closely conform to the exterior dimensions of spent nuclear fuel elements.

12 Claims, 3 Drawing Figures

TRANSPORTATION AND STORAGE FOR NUCLEAR FUEL WASTES

BACKGROUND OF THE INVENTION

This is a continuation of application Ser. No. 538,845, filed Oct. 5, 1983, abandoned, which is a continuation of Ser. No. 263,557, filed May 14, 1981, abandoned.

The present invention relates to an exchangeable basket for a container for the transportation and/or storage of spent nuclear fuel elements. The basket serves as a storage support for the fuel elements disposed in the container and comprises compartments which are shaped to closely conform to the exterior dimensions of the fuel elements.

An insertion or storage basket is normally required when spent nuclear fuel is transported or stored in a container in order to simultaneously provide for receiving spent nuclear fuel elements and maintaining them in a desired position in the container for during transportation and also during storage. The respective necessary fuel element positions are formed as compartments in the basket into which the fuel elements are inserted. Each compartment's cross-section is designed in shape and dimensions according to the type of fuel element to be inserted so that the fuel elements can be inserted and removed without difficulty by remote control apparatus. The insertion or storage basket must be sufficiently stable that it can withstand the mechanical and thermal loads experienced during transportation. Also, the containers must be so constructed that the fuel elements to be conveyed will not be damaged during transportation and subsequent handling.

In the prior art, such baskets are normally constructed as pure steel supports or, as massive blocks of non-ferrous metal. The compartments of the blocks are produced mechanically and in some cases they are steel clad.

Steel frameworks are suitable as storage baskets if there is located in the baskets a corresponding liquid which can carry off from the container walls the residual heat produced from the fuel elements. The steel framework can consist of boron steel wherein the boron serves as a neutron absorber.

The massive, non-ferrous constructions having compartments are suitable as storage baskets since they make it possible to draw off the residual heat produced since such material is a good heat conductor and does not require an additional heat transfer medium. Preferably, they consist of aluminum, copper or an alloy thereof. These alloys likewise can include boron or cadmium to act as neutron absorbers.

Also the following materials are usable: cast iron, brass, bronze, lead, magnesium, uranium, concrete, argillaceous earth, ceramic, wood, carbon, resin.

However, in the previously known storage containers, there have been a number of disadvantages. While the steel frames are stable at the high temperatures involved, they exhibit poor heat conducting properties. On the other hand, the block-type frames, at high temperatures, have low tensile strength but still have good heat conducting properties. Also, the production of these types of baskets has been very expensive since the demands on the compartments are very high in terms of the tolerances, grade of materials used and the surface qualities demanded.

It is an object of the present invention to provide a storage basket for containers for transporting and/or storing spent nuclear fuel elements which combine the tensile strength of the steel frames with the good heat conductivity of the block-type frames made of non-ferrous metals. As a result, an insertion basket can be formed which resists both the mechanical and thermal stresses encountered and which makes good use of the heat conductivity of the material to remove the residual heat.

SUMMARY OF THE INVENTION

According to the present invention, there is provided a storage basket wherein appropriately shaped steel tubes are embedded with connecting elements in a casting of a good heat conductor such as a non-ferrous metal or a non-ferrous alloy. The manufacture is carried out in such a manner that the stainless steel tubes having circular or angular cross-sections are connected by connecting elements in a framework and then the framework and tubes are surrounded by casting with a non-ferrous metal. Preferably aluminum, copper or their alloys is used. The steel and non-ferrous metals can, if it is necessary, be provided with neutron absorbers. The present invention has the advantage that the steel framework, can be supported at the inner wall of the container. This concept insures great mechanical strength at high temperature. The non-ferrous metal block, being a good heat conductor, solves the problem of dealing with the residual heat of the spent fuel elements. Also, in the manufacture, the heat treatment of the inner surfaces of the steel tubes, the centering and the exact alignment of the tubular compartments, all can be carried out before the casting is effected. This is of a special significance if the cross-sections of the compartments are not circular. By pouring in the cast material, any gap formation is avoided between the compartments and the block which would result in poor heat transfer.

The heat transfer by radiation from the fuel elements to the lodgements of the basket is substantially better for steel inserts than for non-ferrous untreated materials such as aluminum.

DETAILED DESCRIPTION ON THE PREFERRED EMBODIMENTS

Figure 1:
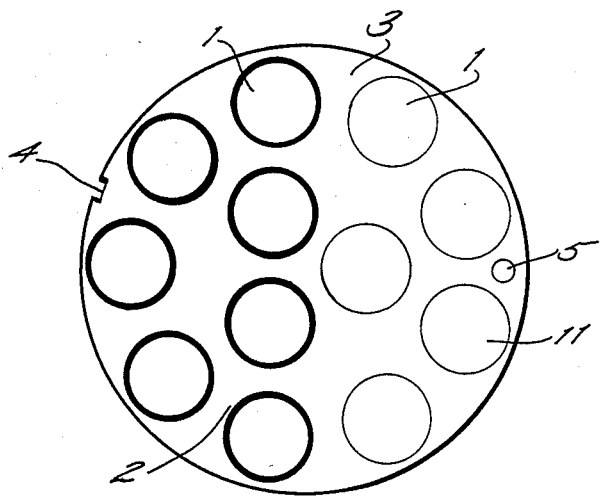
FIG. 1 shows schematically an end view of one form of basket according to the present invention.

FIG. 1 shows a schematic end view of an basket for breeder fuel elements according to the present invention. The basket includes spent fuel receiving steel tubes 1 which are located in apertures 11 formed in a steel plate 2. One or more steel plates 2 may be employed and spaced along the longitudinal axis of the basket to surround the steel tubes 1 at spaced points. The steel tubes 1 and plates 2 form a steel framework about which is cast a metallic material 3 of non-ferrous metal such as aluminum.

The slot 4 in the block 3 and the plates 2 serve for orientation of the basket within the cavity of a container (not shown). The centering pins 5 are necessary if the basket is assembled with two or more plates 2 to align the apertures 11 in the several plates.

Figure 2:
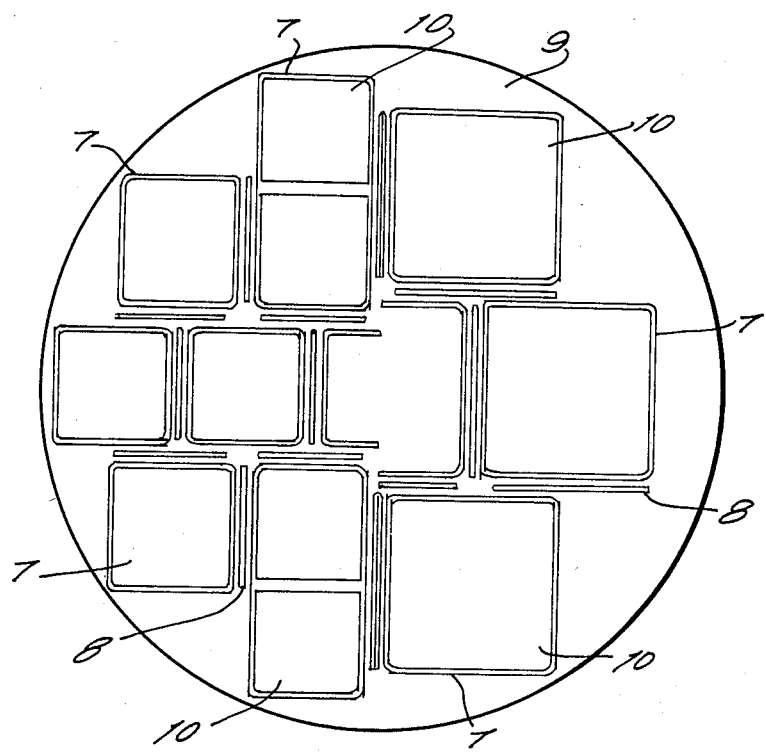
FIG. 2 schematically illustrates another form of the present invention.

FIG. 2 shows another embodiment in end view where the basket has tubular inserts 7 which are square in cross-section and which are made of steel. On the left-hand side of FIG. 2, the size of the inserts 7 is shown as such that seventeen steel inserts for spent boiling water fuel elements can be placed within a cast circular mass or block 9 whereas on the right-hand side, the size of larger steel inserts 7 is shown as such that seven can be provided for receiving spent pressure water fuel elements. Between the square steel inserts 7, $B_4C$ plates 8 are inserted as neutron absorbers in the block 9 which is, again, a non-ferrous metallic material or alloy such as aluminum, copper or alloys of these metals. The spent fuel is inserted into the interior 10 of the inserts 7.

Figure 3:
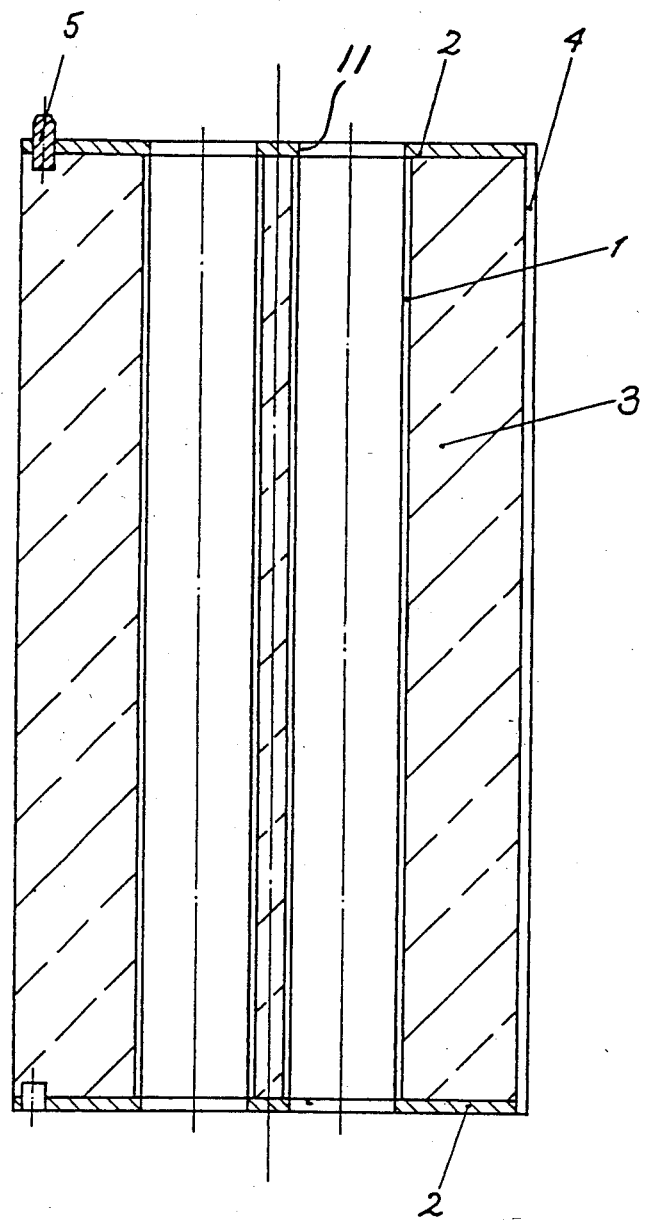
FIG. 3 shows schematically a side view of the basket according to the present invention.

FIG. 3 shows a schematically a cross-section side view of the basket of FIG. 1 according to the present invention. The basket includes the steel tubes 1 and the steel plates 2 which align the tubes 1. The steel framework consisting of steel tubes 1 and plates 2 is cast about with a metallic material 3 of non-ferrous material as aluminum. The slot 4 is necessary to orientate the basket within the cavity of a container. The centering pins 5 serve for alignment of the apertures 11 if the basket is assembled with two or more plates 2 which are stacked over each other.

What is claimed is:

1. An exchangeable basket element for a container for transporting and/or storing spent nuclear fuel elements comprising:
   a plurality of steel tubes of substantially uniform cross-sectional dimensions throughout their length defining compartments shaped for the reception of spent nuclear fuel elements, said tubes being arranged in a spaced-apart and generally parallel relationship to one another;
   steel plate means provided at least at each end of said basket element for laterally connecting together said tubes so as to define, together with said steel tubes, an integral steel framework; and
   a casting of a non-ferrous metallic meterial having high heat conductivity wherein said framework is embedded along its length while leaving at least one end of said tubes open so that fuel elements can be inserted into and withdrawn from said tubes.

2. The basket as claimed in claim 1 wherein the casting material is aluminum.

3. The basket as claimed in claim 1 wherein the casting material is copper.

4. The basket as claimed in claim 1 wherein the casting material is an alloy of aluminum.

5. The basket as claimed in claim 1 wherein the casting material is an alloy of copper.

6. The basket as claimed in claim 1 wherein the casting material includes a neutron absorber.

7. The basket as claimed in claim 6 wherein the neutron absorber is boron.

8. The basket as claimed in claim 6 wherein the neutron absorber is a boron carbide.

9. The basket as claimed in claim 6 wherein the neutron absorber is present in the form of plates embedded in the casting between the tubes.

10. The basket as claimed in claim 1 wherein the connecting means comprise steel plates having apertures in which the steel tubes are received.

11. The basket as claimed in claim 10 wherein the steel plates are shaped to support and center the basket at the inner wall of the container.

12. An exchangeable basket element for use in a container for transporting and/or storing spent nuclear fuel elements comprising:
   a plurality of integral steel tubes having top and bottom ends and a substantially uniform cross-section throughout their length thereby defining compartments shaped for the reception of spent nuclear fuel elements, said tubes being arranged in a spaced-apart generally parallel relationship;
   steel plate means provided at least at each end of said basket element for laterally connecting said tubes together and for maintaining said spaced-apart relationships thereof and to define, together with said tubes, an integral steel framework;
   a casting of a non-ferrous metallic material, having high heat conductivity, in which said integral steel framework is embedded along its length while leaving the top and bottom ends of said tubes open so that fuel elements can be inserted into and withdrawn from said tubes, and
   aligning means provided on said basket element for aligning the basket element within the container and with other similar basket elements therein.

* * * * *